United States Patent
Bowman et al.

(10) Patent No.: US 9,021,780 B2
(45) Date of Patent: May 5, 2015

(54) ENERGY EXTRACTION AND TRANSFER SYSTEM FOR A GAS TURBINE ENGINE

(75) Inventors: Ray F. Bowman, Carmel, IN (US); Philip Ray Owen, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1501 days.

(21) Appl. No.: 12/646,385

(22) Filed: Dec. 23, 2009

(65) Prior Publication Data
US 2010/0164234 A1   Jul. 1, 2010

Related U.S. Application Data

(60) Provisional application No. 61/204,003, filed on Dec. 31, 2008.

(51) Int. Cl.
| | |
|---|---|
| *F02C 9/00* | (2006.01) |
| *F02G 3/00* | (2006.01) |
| *F02C 9/22* | (2006.01) |
| *F02C 7/32* | (2006.01) |
| *F02C 7/36* | (2006.01) |

(52) U.S. Cl.
CPC ... *F02C 9/22* (2013.01); *F02C 7/32* (2013.01); *F02C 7/36* (2013.01); *F05D 2270/05* (2013.01); *F05D 2270/06* (2013.01)

(58) Field of Classification Search
CPC .............. F02C 9/26; F02C 9/28; F02C 7/36
USPC ............. 60/805, 801, 39.24, 802, 39.281
See application file for complete search history.

(56) References Cited

U.S. PATENT DOCUMENTS

| | | |
|---|---|---|
| 4,184,327 A | 1/1980 | Cornett et al. |
| 5,280,702 A | 1/1994 | Jaw |
| 5,623,823 A | 4/1997 | Schirle et al. |
| 5,794,432 A | 8/1998 | Dunbar et al. |
| 5,911,679 A | 6/1999 | Farrell et al. |
| 6,662,546 B1 | 12/2003 | Giffin, III |
| 6,681,558 B2 | 1/2004 | Orlando et al. |
| 6,701,717 B2 | 3/2004 | Flatman et al. |
| 6,735,955 B2 | 5/2004 | Mannarino |
| 6,823,675 B2 | 11/2004 | Brunell et al. |
| 6,837,055 B2 | 1/2005 | Rowe et al. |
| 2006/0042252 A1* | 3/2006 | Derouineau ............... 60/703 |
| 2006/0196164 A1 | 9/2006 | Donohue |
| 2006/0242942 A1 | 11/2006 | Johnson |
| 2006/0242943 A1 | 11/2006 | Johnson |
| 2006/0242962 A1 | 11/2006 | Johnson |
| 2007/0051233 A1* | 3/2007 | Duge ............................ 89/1.13 |

(Continued)

*Primary Examiner* — Gerald L Sung
*Assistant Examiner* — William Breazeal
(74) *Attorney, Agent, or Firm* — Krieg DeVault LLP (57) ABSTRACT

A gas turbine engine is provided having a variety of forms and features. The gas turbine engine can include a compressor having movable vanes. In one form of operation the compressor can close down the vanes to a relatively low flow capacity position and the compressor can be operated at a higher speed, whereupon the vanes can be repositioned and the gas turbine engine operated at a different condition. The gas turbine engine can include a turbine having movable vanes. In one form of operation the turbine can change the vane positions to a relatively low torque position and the engine operated at a higher fuel flow condition, whereupon the vanes can be repositioned and the gas turbine engine operated at a different condition. The gas turbine engine can have a heater that adds heat to a flow stream, a motor that provides energy to a shaft, and an external load.

7 Claims, 6 Drawing Sheets

(56) References Cited

U.S. PATENT DOCUMENTS

| | | | |
|---|---|---|---|
| 2007/0101696 A1* | 5/2007 | Dooley | 60/203.1 |
| 2010/0082217 A1* | 4/2010 | Coons | 701/100 |
| 2010/0251726 A1* | 10/2010 | Jones et al. | 60/773 |

* cited by examiner

ENERGY EXTRACTION AND TRANSFER SYSTEM FOR A GAS TURBINE ENGINE

CROSS REFERENCE TO RELATED APPLICATIONS

The present application claims the benefit of U.S. Provisional Patent Application 61/204,003, filed Dec. 31, 2008, and is incorporated herein by reference.

FIELD OF THE INVENTION

The technical field relates to gas turbine power systems and methods to achieve power changes.

BACKGROUND

Providing the ability to change gas turbine engine power configuration remains an area of interest. Unfortunately, some existing systems have various shortcomings relative to certain applications. Accordingly, there remains a need for further contributions in this area of technology.

SUMMARY

One embodiment of the present invention is a unique gas turbine engine. Other embodiments include apparatuses, systems, devices, hardware, methods, and combinations for changing a configuration associated with a gas turbine engine. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
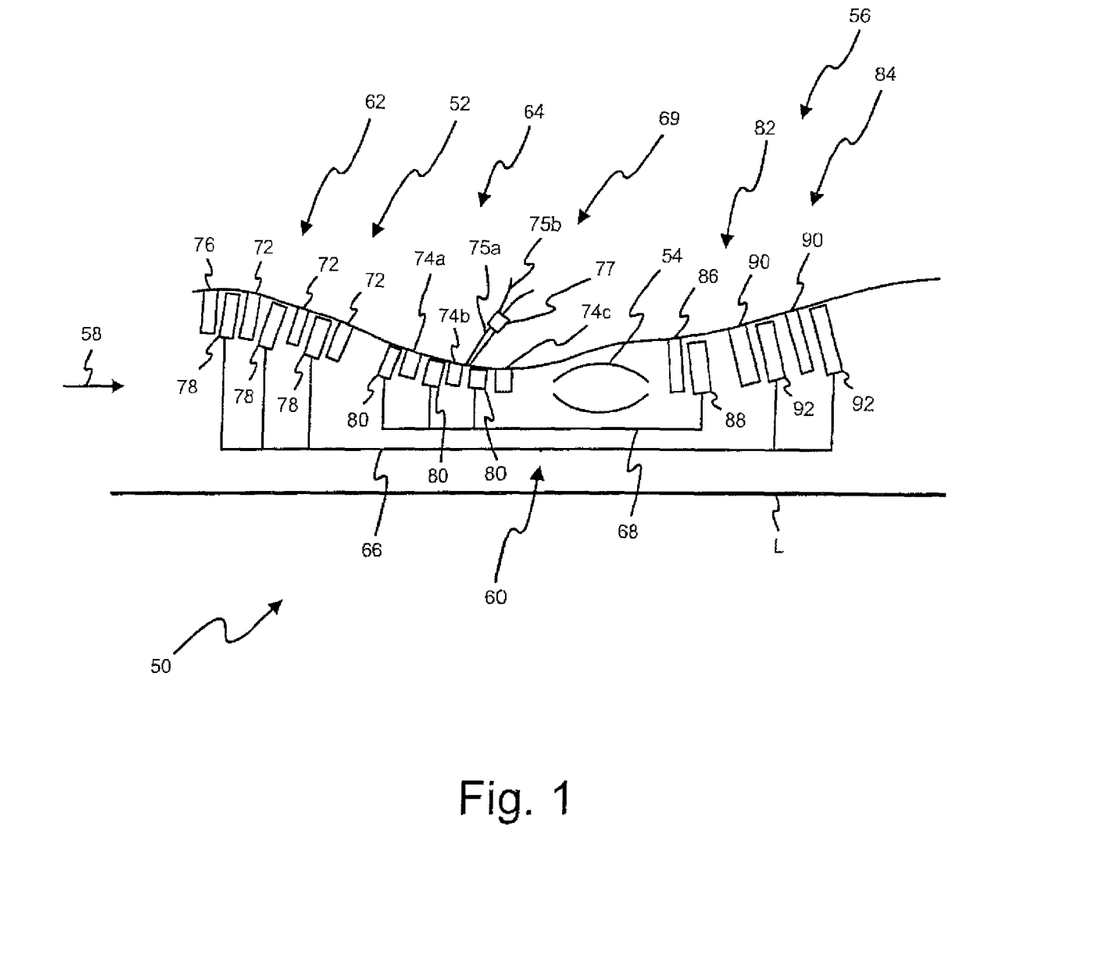
FIG. 1 depicts one embodiment of the present application.

With reference to FIG. 1, a gas turbine engine 50 is shown having a compressor 52, a combustor 54, and a turbine 56, which together may be used as an aircraft power plant. The gas turbine engine 50, as well as the other gas turbine engines designated in this application with similar reference numbers ending in '50', can take a variety of forms such as, but not limited to, a turbofan, turbojet, turboshaft, and turboprop. In fact, any of the various features of the various gas turbine engines discussed below are also contemplated for use in a variety of combinations in any of the other of the gas turbine engines. As used herein, the term "aircraft" includes, but is not limited to, helicopters, airplanes, unmanned space vehicles, fixed wing vehicles, variable wing vehicles, rotary wing vehicles, hover crafts, and others. Further, the present inventions are contemplated for utilization in other applications that may not be coupled with an aircraft such as, for example, industrial applications, power generation, pumping sets, naval propulsion and other applications known to one of ordinary skill in the art. As will be appreciated, the present inventions can be used in a variety of platforms or mobile vehicles, whether or not including the aircrafts described above.

Airflow 58 enters the gas turbine engine 50 and is compressed by the compressor 52 before entering the combustor 54 where it is mixed with fuel and burned before being expanded by the turbine 56. A rotating shafting 60 connects the turbine 56 to the compressor 52 and serves to transfer power between the two. As will be appreciated, the rotating shafting 60 can include more than one shaft. Though the illustrated embodiment depicts an axial flow gas turbine engine, centrifugal compressors and/or turbines may also be incorporated in some alternative embodiments.

The gas turbine engine of the illustrated embodiment includes two separate engine spools, which term is sometimes used to indicate the combination of a compressor section, a shaft, and a turbine section. In some applications, however, a spool may not include a corresponding compressor, as will be described below. The spools are generally referred to as a high pressure (HP) spool and a low pressure (LP) spool. The HP and LP spools are free to rotate at different speeds, although devices, either mechanical, electrical, or otherwise, may transfer power from one shaft to the other. Though the illustrated embodiment depicts spools having shafts that share a common centerline, in some embodiments the spools may include shafts that do not share a common centerline. The HP spool includes a high pressure compressor, a high pressure shaft, and a high pressure turbine which are sometimes denoted as an HP compressor, an HP shaft, and an HP turbine, respectively. Likewise, the LP spool includes a low pressure compressor, a low pressure shaft, and a low pressure turbine which are sometimes denoted as an LP compressor, an LP shaft, and an LP turbine, respectively. Some embodiments, however, may have a low pressure spool without a corresponding compressor, such as would be the case with a turboshaft engine having a free turbine connected directly to a helicopter main rotor, for example. In still other embodiments, the gas turbine engine may include additional spools than those depicted in the illustrated embodiment, such as an intermediate spool to set forth just one non-limiting example.

The compressor 52 includes a low pressure compressor 62 and a high pressure compressor 64 which are each connected to the shafting 60. In particular, the low pressure compressor 62 is connected to a low pressure shaft 66, and the high pressure compressor 64 is connected to a high pressure shaft 68. Other shafts may be included in other embodiments such that the shafting 60 includes more than two shafts. Although not depicted in the illustrated embodiment, other embodiments may include a gearbox or other device between the compressor and turbine of a given spool such that the compressor and turbine rotate at different speeds. The compressor 52 includes a bleed 69 and inlet guide vanes 76 in the illustrated embodiment, but other embodiments may lack such features. In addition, some embodiments of the compressor 52 can include an offtake passage, either separately or in addition to any other features described herein. Each of the low pressure compressor 62 and the high pressure compressor 64 include a series of vanes, denoted as low pressure vanes 72 and high pressure vanes 74a, 74b, and 74c, respectively. The compressor 52 may include more compressor sections including, but not limited to an intermediate compressor section and a fan section, to set forth just two non-limiting examples.

Each of the low pressure compressor 62 and the high pressure compressor 64 has a number of compression stages shown in the illustrated embodiment. In some embodiments, the number of compression stages may be greater than or less than the number of stages depicted in the illustrated embodiments. As will be understood, each compression stage includes a row of rotating compressor blades followed by a vane. For example, the low pressure compressor 62 includes three rows of rotating blades 78 each followed by a row of independently variable low pressure vanes 72. Likewise, the high pressure compressor 64 includes three rows of rotating blades 80 each followed by a row of independently variable high pressure vanes 74a, 74b, and 74c.

Each row of blades 78 in the low pressure compressor 62 rotate at a same speed about a centerline L of the gas turbine engine 50, just as do each row of blades 80 in the high pressure compressor 64. However, the high pressure compressor blades 80 may not rotate at the same rate as the low pressure compressor blades 78. One or more rotors associated with either or both blades 78 and 80 can be capable of contra-rotation relative to rotors associated with other of the blades. If any of the rotors are capable of contra-rotation, some of the vanes may not be needed. Neither the variable inlet guide vanes 76 nor the vanes 72, 74a, 74b, and 74c rotate about centerline L. Rather, the inlet guide vanes 76 and the vanes 72, 74a, 74b, and 74c are fixed relative to their centerline but are capable of rotating to an angle relative to the airflow traversing the compressor 52, as will be understood by those in the art. In some forms, however, one or more of the vanes 72, 74a, 74b, and 74c may be fixed and not capable of rotating to an angle relative to the airflow traversing the compressor 52.

For each set of high pressure vanes 74a, 74b, and 74c that are capable of being rotated relative to the airflow, each vane in the row rotates to a common angle which is defined relative to the centerline of the vanes. The vanes 74a, 74b, and 74c can be rotated via any suitable mechanism including a single hydraulic piston configured to rotate a set of rings that encircle the high pressure compressor 64, where there is at least one ring for each vane row. Each of the vanes 74a, 74b, and 74c is connected to its ring or rings by levers. The rotation of the rings causes the levers to move thus providing the rotation of the vanes. Other mechanisms of rotating the vanes are also contemplated herein. Each vane row 74a, 74b, and 74c is independently variable relative to each other row. For example, the common angle in vane row 74a need not be the same as the common angle in vane row 74b. In some applications the vane rows need not be independently variable. In some embodiments, one or more of vane rows 74a, 74b, and 74c may be fixed and not capable of rotating to a common angle. However, it is contemplated herein that at least two rows of vanes 74a, 74b, and 74c are independently variable. In some embodiments, a full authority digital engine controller (FADEC) may be used to independently vary or otherwise schedule the vanes 74a, 74b, and 74c. Each angle of the vanes 74a, 74b, and 74c relative to the airflow traversing through the compressor 64 is denoted as $\alpha$, and the set of angles for vane rows 74a, 74b, and 74c is denoted as a boldface $\boldsymbol{\alpha}$. The vanes 74a, 74b, and 74c can be rotated to a set of angles $\boldsymbol{\alpha}$ to restrict the airflow traversing through the high pressure compressor 64 relative to a non-restricted condition, which will be described further hereinbelow.

The bleed 69 is configured downstream of the second stage in the high pressure compressor 64 and includes a first conduit 75a, a second conduit 75b, and a valve 77. Other configurations of the bleed 69 are also contemplated. The bleed 69 is configured to remove, or bleed, air from the flow traversing through the high pressure compressor 64. The airflow that is bled from the high pressure compressor 64 through the bleed 69 can be routed elsewhere in the gas turbine engine 50, or alternatively may be vented overboard. Although the bleed 69 is configured downstream of the second stage in the high pressure compressor 64, other embodiments may locate the bleed 69 elsewhere in the gas turbine engine 50. In addition, the gas turbine engine 50 may include more than one bleed 69, either arranged at the same axial station downstream of the second stage, at least in the illustrated embodiment, or may be configured elsewhere in the engine.

The valve 77 is configured to remove air at a variable rate from the high pressure compressor 64, and may also be shut off such that no air is removed. Various types of valves are contemplated for use as the valve 77, such as a shut off valve, a throttling valve, or a split flow valve, to set forth just a few non-limiting embodiments. The valve 77 may be either manually or automatically actuated, such as through the use of a FADEC or an operator input.

The inlet guide vanes 76 include a row of vanes that may be used in conjunction with the variable high pressure vanes 74a, 74b, 74c and/or the bleed 69 to restrict air flow through the gas turbine engine 50. Although the inlet guide vanes 76 are depicted upstream of the low pressure compressor 62, other embodiments may arrange the inlet guide vanes 76 upstream of the high pressure compressor 64, such as can be the case in a turboshaft engine, to set forth just one non-limiting example. As described above, as the airflow is decreased, fueling to the combustor 54 is adjusted to offset any corresponding change in speed of the high pressure compressor 64. The inlet guide vanes 76 can be rotated to a position independent of the variable high pressure vanes 74a, 74b, and 74c.

The turbine 56 includes a low pressure turbine 84 and a high pressure turbine 82, each of which are connected to corresponding shafts denoted as the low pressure shaft 66 and the high pressure shaft 68. The low pressure turbine 84 and the high pressure turbine 82 can rotate at the same rate as the corresponding low pressure compressor 62 and the high pressure compressor 64, respectively. In some non-limiting forms a gear or gearbox can be coupled between respective turbines and compressors.

The high pressure turbine 82 includes a single stage having a row of vanes 86 followed by a row of blades 88. The high pressure turbine 82 may include additional stages in other embodiments. The vanes 86 are capable of rotating to an angle with respect to the airflow traversing the high pressure turbine 82, but do not otherwise rotate about the centerline L. In some forms the vanes 86 can be fixed. The blades 88, on the other hand, do rotate about their centerline but do not otherwise rotate in the same manner as the vanes 86, as will be appreciated by those skilled in the art. Though not depicted, a row of turbine outlet guide vanes may be included in some embodiments.

The low pressure turbine 84 includes two stages of low pressure turbine vanes 90 and blades 92. In some embodiments, the low pressure turbine 84 may include either fewer or more stages. In some forms one or more rotors associated with either or both blades 88 and 92 can be contra-rotatable relative to other of the rotors. In some applications one or more vane rows may not be needed if any of the rotors are contra-rotatable. Though not depicted, a turbine outlet guide vane may be included in some embodiments. Each row of vanes 90 may be independently movable or may move together. It will be understood herein that any given turbine stage throughout the gas turbine engine 50 may be configured as either an impulse turbine stage or a reaction stage, depending on the needs of a given application.

The operation of the gas turbine engine 50 and various other embodiments proceed as follows. Consider operating condition "A" in which relatively little LP turbine torque, $T_A$, is transmitted to the LP shaft 66, and the variable high pressure vanes 74a, 74b, and 74c are set at angles that approximately optimize the HP compressor efficiency. Designate this set of vane angles collectively as $\alpha_A$. Designate the rotational speed of the HP spool as $NHP_A$. Now consider operating condition "B" in which more LP turbine torque, $T_B$, is transmitted to the LP shaft than in condition "A" ($T_B > T_A$). Suppose again that the variable high pressure vanes 74a, 74b, and 74c are set at angles $\alpha_B$ that approximately optimize the HP compressor efficiency, and that the speed of the HP spool consequently is $NHP_B$. The discussion herein assumes that sustained high torque transfer from the LP turbine to the LP shaft requires a higher HP spool rotational speed than is required for low torque transfer to the LP shaft. Therefore, $NHP_B > NHP_A$.

If the gas turbine engine 50 is operating at condition "A" to produce $T_A$, but a rapid transition to condition "B" to produce $T_B$ is anticipated, the following sequence of events can occur to achieve the transition. Before the transition from $T_A$ to $T_B$ occurs, the HP compressor variable vane angles $\alpha_A$ are controlled from $\alpha_A$ so as to reduce the flow capacity of the compressor at a given speed. Engine fuel flow is simultaneously controlled, however, to maintain torque $T_A$ transmitted by the LP turbine to the LP shaft. The result is that the HP spool rotates faster than $NHP_A$ to produce the gas flow required to drive the LP turbine to produce torque $T_A$. During the transition from condition "A" to a standby condition, the variable vanes and the engine fuel flow, and perhaps other factors such as operation of the bleed 69, or rotation of the inlet guide vanes 76, or rotation of vanes 86, are controlled together until the HP spool speed reaches $NHP_B$ (or as near as stress considerations or other operational limits will allow) but the LP turbine still transmits only torque $T_A$ to the LP shaft. Once the engine settles into a steady state, the engine can be considered to be in a standby mode for condition "B", with the HP compressor variable vane angles having values collectively designated $\alpha_{standby}$. When the transition from $T_A$ to $T_B$ is required, the HP compressor variable vane angles are rapidly transitioned from $\alpha_{standby}$ to angle set $\alpha_B$ while the fuel flow and any other controlled engine parameters are adjusted as required to achieve condition "B". This transition from $T_A$ to $T_B$ can be accomplished rapidly because the HP spool is already rotating at or near its required speed. The procedure can be reversed when a rapid decrease in power, as from $T_B$ to $T_A$, is required.

Figure 2:
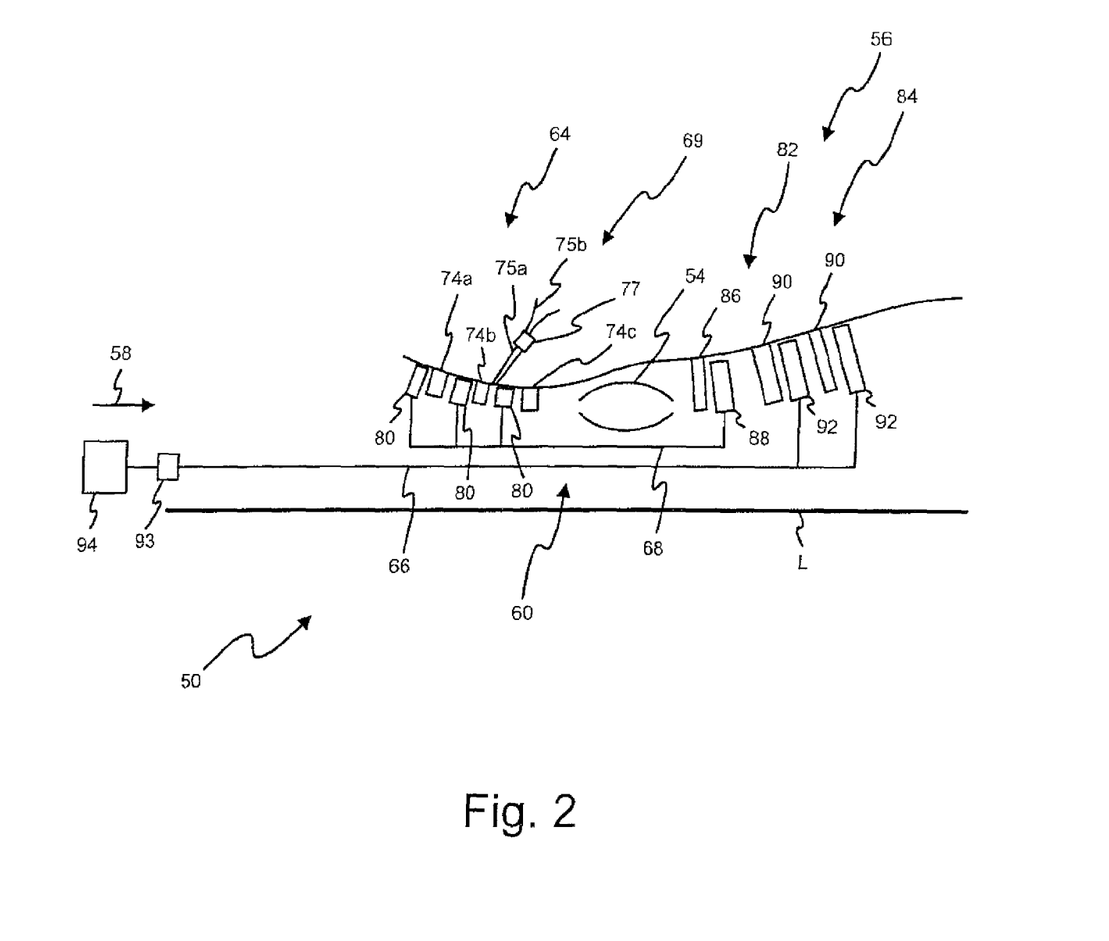
FIG. 2 depicts one embodiment of the present application.

FIG. 2 depicts an embodiment of the gas turbine engine 50 of FIG. 1 configured to provide power to an external load 94 through a generator 93. In one application the external load 94 can take the form of a directed energy weapon 94. In this embodiment, the gas turbine engine 50 is configured as a turboshaft engine and has only the HP compressor 64, the combustor 54, the HP turbine 82, and the LP turbine 84. Other types of gas turbine engines, other than a turboshaft, can also be utilized to drive the directed energy weapon 94. In addition, other embodiments may include more spools than the LP and the HP spools depicted in FIG. 2. It should be appreciated that the discussion that below regarding the directed energy weapon 94 in FIG. 2, as well as discussions that follow regarding other directed energy weapons with respect to the other figures, is intended for illustration purposes only and does not otherwise limit the scope of the external load, of which the directed energy weapon is but one example. To set forth just one additional non-limiting example, in some applications the external load could be a source of direct mechanical power absorption such as a propeller or helicopter rotor.

The generator 93 is coupled to the LP shaft 66 of the gas turbine engine 50 and provides electrical power to the directed energy weapon 94 upon rotation of the LP shaft 66. The generator 93 and/or associated electronics is capable of producing any form of electrical power, whether direct current (DC) or alternating current (AC). Furthermore, the generator 93 may be driven by any shaft of the gas turbine engine 50, not just via the LP shaft 66 as depicted in the illustrated embodiment. The generator 93 may provide a range of power at a variety of rotational speeds of the LP shaft 66. A controller can be provided to set the LP shaft 66 at a constant rotational speed. Though not depicted in the illustrative embodiment, other mechanical devices such as gearing or a clutch assembly may be provided between the generator 93 and the LP shaft 66.

The directed energy weapon 94 receives electrical power provided from the generator 93 and converts it to radiant electromagnetic energy output. An antenna or other radiator may be included in the directed energy weapon 94 to provide for the radiant energy output. In one form, the directed energy weapon 94 is a form of a gyrotron that generates a directed, radiant electromagnetic output in the microwave range. In other forms, the directed energy weapon 94 may be based on a form of laser, such as a free electron laser, that may extend from the microwave regime to the visible light spectrum. The directed energy weapon 94 may also be a combination of different radiant energy generators.

In one form the operation of the embodiment depicted in FIG. 2 proceeds as follows. The two-spool turboshaft gas turbine engine 50 is used to provide electrical power for the directed energy weapon 94 by driving the electrical generator 93 connected to the LP spool. A controller (not shown) for the generator 93 maintains an approximately constant mechanical rotation speed for the LP shaft 66. In alternative embodiments, however, the controller need not maintain a constant mechanical rotation speed. At idle power and therefore low output torque of the LP turbine 82, no net electrical power is produced by the generator 93, and the HP spool rotates at a relatively low speed compared to its design point. In some embodiments, however, the generator 93 may produce electrical power at the engine idle condition. Before the directed energy weapon 94 is to be energized, the gas turbine engine 50 is placed in a standby mode, which can occur at any time such as, but not limited to, a few seconds before the directed energy weapon 94 is to be energized. The generator 93, the engine fuel flow to the combustor 54, and the angle of the variable high pressure vanes 74a, 74b, and 74c are controlled together to produce an HP spool speed corresponding to full power operation while producing only low output torque of the LP turbine 82 and therefore idle power to the electrical generator 93. In other embodiments, the bleed 69 and/or an inlet guide vane (not shown) may be operated in conjunction with the engine fuel flow and the variable high pressure vanes 74a, 74b, and 74c. Other components and/or parameters can be used in addition or alternative to the components and/or parameters listed herein. Furthermore, a variety of combinations of the components and/or parameters can be used, and not strictly the groupings listed above. To energize the external load 94, which in the illustrated embodiment is the directed energy weapon 94, the variable high pressure vanes 74a, 74b, and 74c are moved to their design value to produce a greater amount of torque output of the LP turbine 82, while electrical power required for operation of the directed energy weapon 94 is drawn from the generator 93. The fuel flow is adjusted as required to maintain the power required by the generator 93. To de-energize the directed energy weapon 94, the electrical power drawn from the generator 93 is interrupted, the variable high pressure vanes 74a, 74b, and 74c are moved to their standby position, and the fuel flow is adjusted as required to maintain a constant HP spool speed. To return the engine to idle, the fuel flow is varied and the angle of the variable high pressure vanes 74a, 74b, and 74c are adjusted until the normal idle configuration is achieved.

Figure 3:
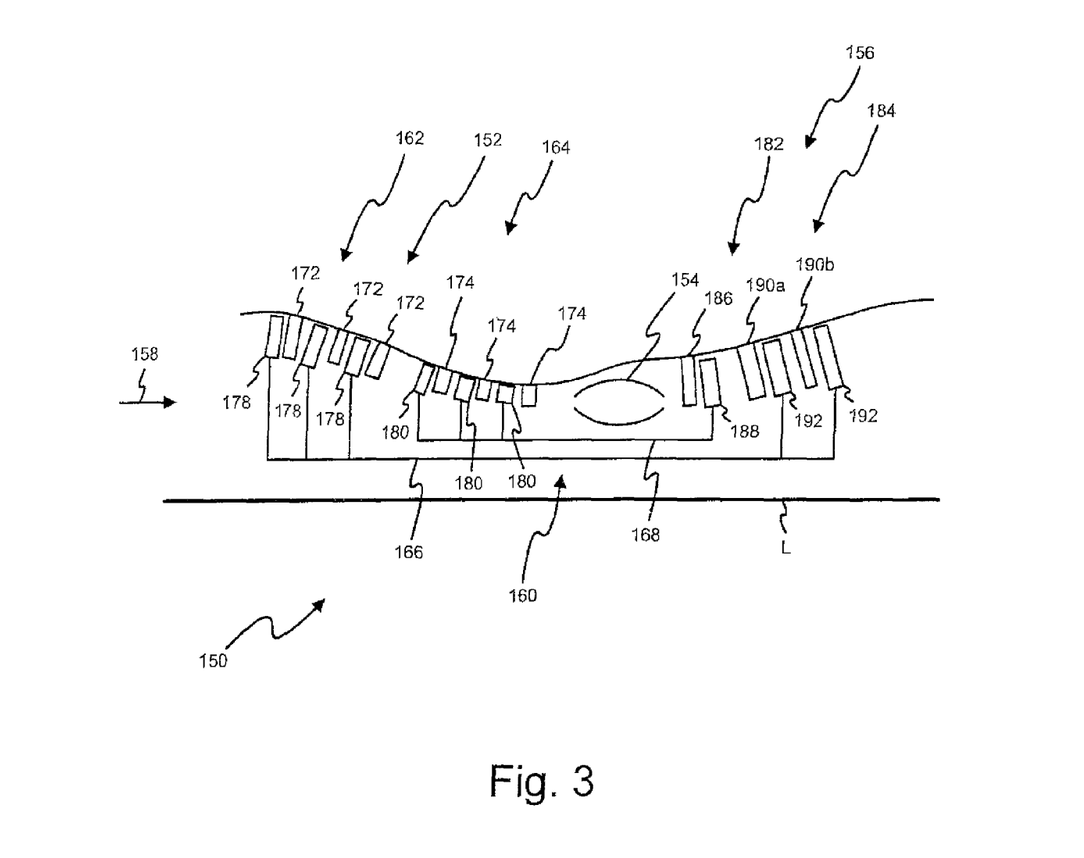
FIG. 3 depicts one embodiment of the present application.

Turning now to FIG. 3, an embodiment of a gas turbine engine 150 is shown having the capability to produce rapid changes in turbine output torque through the use of independently variable turbine vanes. The gas turbine engine 150 includes a compressor 152, a combustor 154, and a turbine 156. Airflow 158 is compressed by the compressor 152 and is burned with fuel in the combustor 154 before being expanded by the turbine 156. The compressor 152 and the turbine 156 are connected via a shafting 160, which includes a low pressure shaft 166 and a high pressure shaft 168. Though the illustrative embodiment is depicted as an axial flow gas turbine engine 150, other configurations are also contemplated. To set forth just one example, airflow may enter, say, a turbine of the illustrative embodiment in either primarily an axial direction or from a primarily radial direction, or from any other direction. In one non-limiting embodiment, the turbine 156 may include a radial inflow turbine followed by an axial flow turbine, to set forth just one non-limiting example.

The compressor 152 includes a low pressure compressor 162 and a high pressure compressor 164, each of which contain a number of compression stages. In other embodiments, the number of stages may be different than the numbers depicted in FIG. 3. The low pressure compressor 162 includes three stages of compressor blades 178 and vanes 172. The vanes 172 may be individually fixed or may be capable of rotating relative to the airflow traversing the low pressure compressor 162. The angle of rotation of the vanes 172 may vary from stage to stage.

The high pressure compressor 164 includes three stages of compressor blades 180 and vanes 174. Just as in the low pressure compressor 162, the vanes 174 in the high pressure compressor 164 may either be individually fixed or may be capable of rotating relative to the airflow traversing the high pressure compressor 164. The angle of rotation of vanes 174 may vary from stage to stage.

The turbine 156 includes a high pressure turbine 182 and a low pressure turbine 184 which are connected to the corresponding compressors 164 and 162 via the high pressure shaft 168 and the low pressure shaft 166, respectively.

As set forth in the illustrative embodiment, the HP turbine 182 in the illustrated embodiment has a single turbine stage, while the LP turbine 184 has two turbine stages. In some embodiments, the number of turbine stages may be greater than the single stage depicted in the HP turbine 182 of the illustrative embodiment, or greater than or less than the number of stages depicted in the LP turbine 184. As will be understood, each turbine stage includes a row of vanes followed by a row of rotating turbine blades. For example, the HP turbine 182 includes a row of vanes 186 followed by a row of rotating blades 188. The LP turbine 184, on the other hand, includes two rows of independently variable vanes 190a and 190b each followed by two rows of rotating blades 192.

Each vane in a row of the LP turbine variable vanes 190a and 190b are capable of being rotated to a common angle which is defined relative to the centerline L, much like the independently variable high pressure vanes 74a, 74b, and 74c of FIGS. 1 and 2. In addition, each vane row 190a and 190b is independently variable relative to each other row. For example, the common angle in the vane row 190a need not be the same as the common angle in the vane row 190b. In some embodiments, one of the vane rows 190a and 190b may be fixed and not capable of rotating to a common angle. In those embodiments with more than two stages, any number of rows of vanes can be fixed provided at least one row is capable of rotating to a common angle. In some embodiments, a full authority digital engine controller (FADEC) may be used to independently vary or otherwise schedule the vanes 190a and 190b. Each angle of the vanes 190a and 190b relative to the airflow traversing through the high pressure compressor 164 is denoted as $\alpha$, and the set of angles for the vane rows 190a and 190b is denoted as a boldface $\alpha$. The vanes 190a and 190b can be rotated to a set of angles $\alpha$ to restrict the airflow traversing through the LP turbine 184 relative to a non-restricted condition, which will be described further hereinbelow.

Each row of the blades 192 in the LP turbine 184 transmits torque to the same shaft. The blades 192 may transfer torque to the shaft directly, through any sort of structure, through use of gears, or by any other means. The vanes 190a and 190b can be rotated to change the direction and/or the amount of the gas flow entering the blades 192. The direction and/or amount of gas flow into the blades 192 affect the torque transmitted by the blades 192 to the LP shaft 166. Stated differently, the angle of each row of the vanes 190a and 190b are varied in a controlled way to affect the total torque transmitted by the LP turbine 184 to the LP shaft 166.

In one form the operation of the embodiment depicted in FIG. 3 proceeds as follows. Consider operating condition "A" in which relatively little LP turbine torque, $T_A$, is transmitted to the LP shaft 166, and the LP turbine vanes 190a and 190b are set at angles that approximately optimize the LP turbine efficiency. Designate this set of vane angles collectively as $\alpha_A$. The speeds of the higher pressure spools in the engine are known, and in the illustrative embodiment this only includes the HP spool as there is no intermediate spool. For example, the HP spool rotates at known speed $NHP_A$. Now consider operating condition "B" in which more LP turbine torque, $T_B$, is transmitted to the LP shaft 166 than in condition "A" ($T_B > T_A$). Suppose again that the LP vanes 190a and 190b are set at angles $\alpha_B$ that approximately optimize the LP turbine efficiency, and that the speeds of the higher pressure spools at this condition are again known. The HP spool speed, designated at condition "B", is $NHP_B$. Condition "B" also requires more fuel flow than condition "A". The discussion herein assumes that sustained high torque transfer from the LP turbine to the LP shaft requires a higher HP spool rotational speed than is required for low torque transfer to the LP shaft. Therefore, $NHP_B > NHP_A$.

Suppose the engine is operating at condition "A", but a rapid transition to condition "B" is anticipated. Before the transition is actually required, the fuel flow to the combustor 154, the angle of the LP turbine vanes 190a and 190b, and any other controlled engine parameters are varied together such that the fuel flow increases but the total LP turbine torque transmitted to the LP shaft 166 remains approximately constant at the level corresponding to condition "A". Controlled parameters are varied in this way until the other spools reach approximately their speeds corresponding to condition "B", or as near as stress considerations or other operational limits allow. For example, the fuel flow and the LP turbine vane angles are controlled such that the HP spool is rotating at or near speed $NHP_B$, but the torque transmitted by the LP turbine to the LP shaft is $T_A$. Other components and/or parameters can be used in addition or alternative to the components and/or parameters listed herein. Furthermore, a variety of combinations of the components and/or parameters can be used, and not strictly the groupings listed above. The engine can be considered to be in a standby mode for condition "B", with the LP turbine vane angles having values collectively designated $\alpha_{standby}$. When the transition from $T_A$ to $T_B$ is required, the LP turbine vane angles are rapidly transitioned to angle set $\alpha_B$ while the fuel flow and any other controlled parameters are adjusted as required to achieve condition "B". This transition from $T_A$ to $T_B$ can be accomplished rapidly because the high pressure spools are already rotating at or near their required speeds (the HP spool is already rotating at $NHP_B$, for example). The procedure can be reversed when a rapid decrease in power, as from $T_B$ to $T_A$, is required.

The various embodiments described above allow more rapid changes in power delivered by the LP turbine 184 to the LP shaft 166 than can be achieved with an ordinary gas turbine engine. The embodiments utilize the variable LP turbine vanes 190a and 190b to reduce the torque transferred by the LP turbine 184 to the LP shaft 166 while the rest of the gas turbine engine 150 operates at speeds corresponding to a high power condition. The transition from a low power condition to a high power condition can thus be achieved without the time required for acceleration of the higher pressure spools.

In alternative embodiments, the independently movable vanes 190a and 190b of the LP turbine 184 may be used in conjunction with independently movable vanes of the HP compressor, much like the vanes 74a, 74b, and 74c described above. Additionally and/or alternatively, the independently movable vanes 190a and 190b can be used in conjunction with a compressor bleed and/or inlet guide vanes similar to those structures described above with respect to FIGS. 1 and 2.

Figure 4:
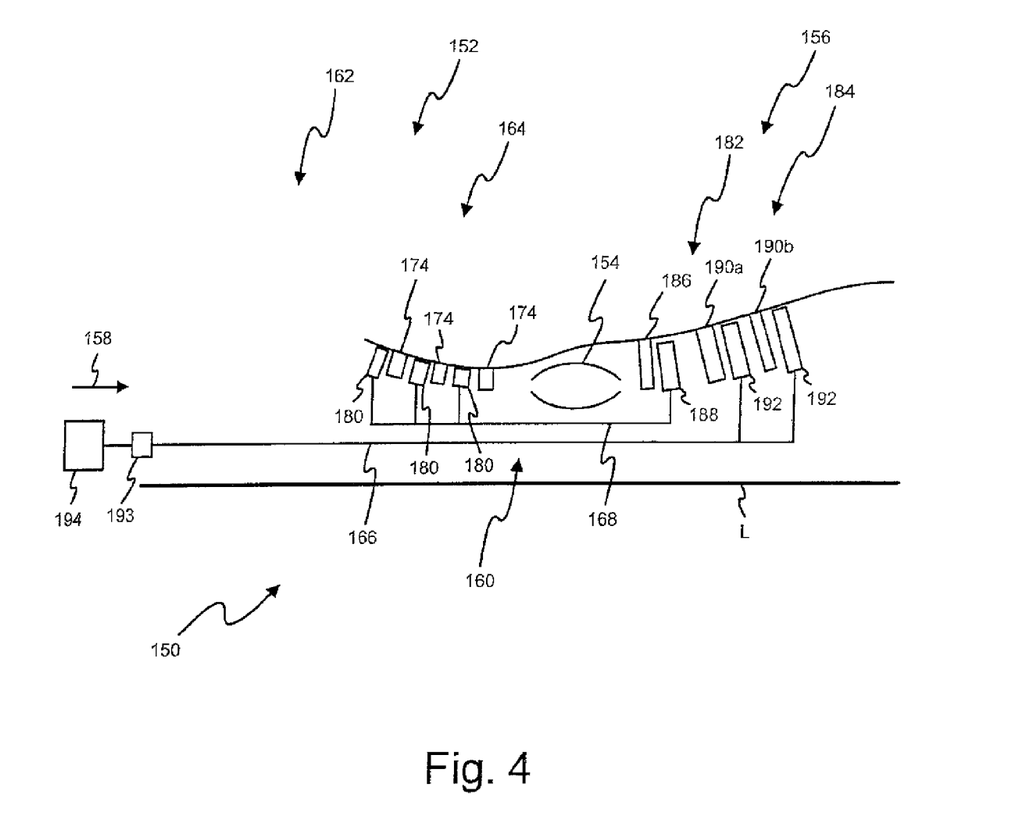
FIG. 4 depicts one embodiment of the present application.

FIG. 4 depicts an embodiment of the gas turbine engine 150 of FIG. 3 configured to provide power to an external load 194 through a generator 193. In one application the external load 194 takes the form of a directed energy weapon. In this embodiment, the gas turbine engine 150 is configured as a turboshaft engine and has only the HP compressor 164, the combustor 154, the HP turbine 182, and the LP turbine 184. Other types of gas turbine engines, other than a turboshaft, can also be utilized to drive the directed energy weapon 194. In addition, other embodiments may include more spools than the LP and HP spools depicted in FIG. 4.

The generator 193 is coupled to the LP shaft 166 of the gas turbine engine 150 and provides electrical power to the directed energy weapon 194 upon rotation of the LP shaft 166. The generator 193 is capable of producing any form of electrical power, whether direct current (DC) or alternating current (AC). Furthermore, the generator 193 may be driven by any shaft or drive mechanism coupled to the gas turbine engine 150, not just via the LP shaft 166 as depicted in the illustrated embodiment. The generator 193 may provide a range of power at a variety of rotational speeds of the LP shaft 166. Though not depicted in the illustrative embodiment, other mechanical devices such as gearing or a clutch assembly may be provided between the generator 193 and the LP shaft 166.

The directed energy weapon 194 receives electrical power provided from the generator 193 and converts it to radiant electromagnetic energy output. An antenna or other radiator may be included in the directed energy weapon 194 to provide for the radiant energy output. In one form, the directed energy weapon 194 is a form of a gyrotron that generates a directed, radiant electromagnetic output in the microwave range. In other forms, the directed energy weapon 194 may be based on a form of laser, such as a free electron laser, that may extend from the microwave regime to the visible light spectrum. The directed energy weapon 194 may also be a combination of different radiant energy generators.

The operation of the embodiment depicted in FIG. 4 proceeds as follows. The gas turbine engine 150 drives the electrical generator 193 via rotation of the low pressure spool 166. A controller (not shown) for the generator 193 may maintain an approximately constant mechanical rotation speed for the LP shaft 166. At idle power, no net electrical power is produced by the generator 193, and the HP spool rotates at a relatively low speed compared to its design point. The LP turbine vanes 190a and 190b may be varied in the setting angle with a mechanism similar to that used to vary the setting angle of HP compressor vanes in the embodiments of FIGS. 1 and 2 above. At least a few seconds before the directed energy weapon 194 is to be energized, the engine is placed in a standby mode. The generator 193, the fuel flow to the combustor 154, and the LP turbine vane angles α are controlled together to produce an HP spool speed corresponding to full power operation while producing only idle power to the electrical generator. To energize the directed energy weapon 194, the required electrical power is drawn from the generator 193, the LP turbine vanes 190a and 190b are moved to their design value, and fuel flow is adjusted as required to maintain the power required by the generator. To de-energize the directed energy weapon 194, the electrical power drawn from the generator 193 is interrupted, the LP turbine vanes 190a and 190b are moved to their standby position, and the fuel flow is adjusted as required to maintain a constant HP spool speed. To return the engine to idle, the fuel flow is reduced and the LP turbine vane angles α are adjusted until the normal idle configuration is achieved.

Figure 5:
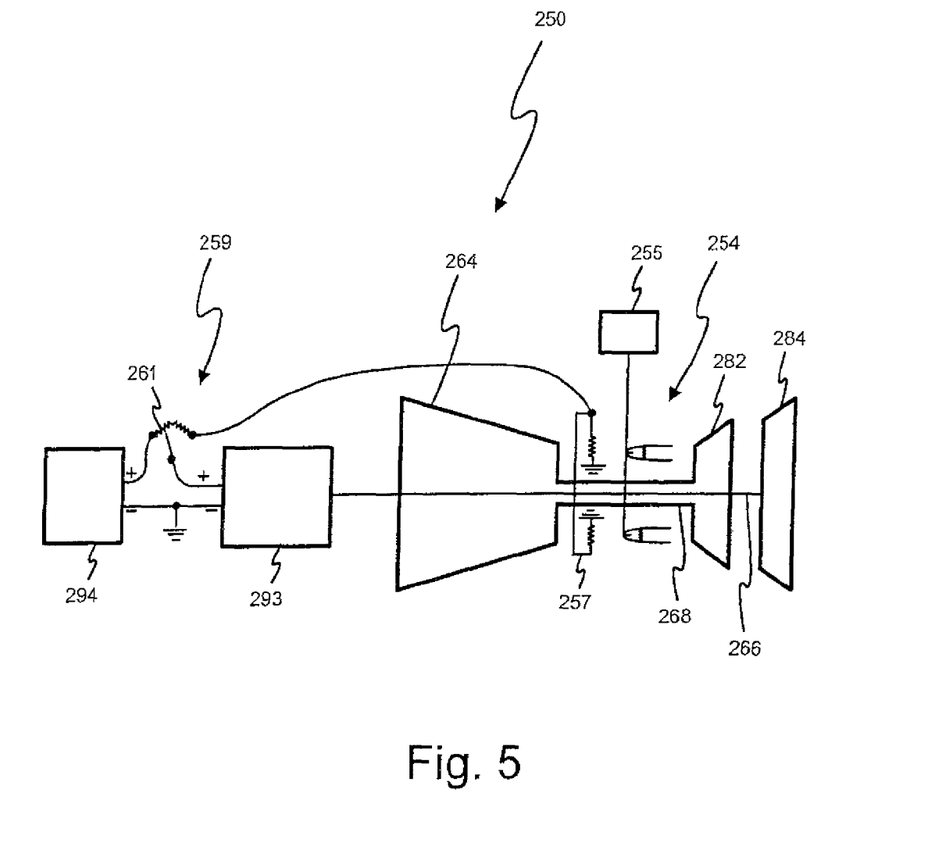
FIG. 5 depicts one embodiment of the present application.

FIG. 5 depicts an embodiment of a gas turbine engine 250 that includes heaters powered by a low pressure turbine and that are disposed downstream of a compressor to provide for heat addition to an airflow. The heat addition can either be a supplement or a replacement of the heat addition by the combustion of a fuel/air mixture in a combustor. The gas turbine engine 250 of the illustrative embodiment is configured as an aircraft power plant.

The gas turbine engine 250 includes a high pressure compressor 264, a combustor 254, a high pressure turbine 282, and a low pressure turbine 284 which together produce mechanical power to drive a generator 293. The generator 293 converts the mechanical power to electrical power which is used to power a heater 257 and a Primary Load device which is depicted as a directed energy weapon 294 in the illustrated embodiment, but may be an embodiment with just a heater and no directed energy weapon. In some applications the Primary Load can take the form of other external energy consuming devices, just as in any of the other embodiments depicting an external load or Primary Load. Power can be arbitrarily shared and/or switched between the Primary Load directed energy weapon 294 and the heater 257 through a circuit 259, the details of which are described hereinbelow.

The gas turbine engine 250 includes two engine spools: a high pressure spool and a low pressure spool. It will be appreciated, however, that any number of other spools may also be provided in other embodiments. The high pressure spool includes the high pressure compressor 264, a high pressure shaft 268, and the high pressure turbine 282. Unlike the high pressure spool, the low pressure spool in the illustrative embodiment includes only a low pressure shaft 266 and the low pressure turbine 284.

The generator 293 is coupled to the LP shaft 266 of the gas turbine engine 250 and, upon rotation of the LP shaft 266, provides electrical power to the circuit 259, and thus selectively to the directed energy weapon 294 and the heater 257.

The generator 293, just as in the generators discussed in various embodiments hereinabove, is capable of producing any form of electrical power, whether direct current (DC) or alternating current (AC). Furthermore, the generator 293 may be driven by any shaft of the gas turbine engine 250, not just via the LP shaft 266 as depicted in the illustrated embodiment. The generator 293 may provide a range of power at a variety of rotational speeds of the LP shaft 266. Though not depicted in the illustrative embodiment, other mechanical devices such as gearing or a clutch assembly may be provided between the generator 293 and the LP shaft 266.

The combustor 254 is arranged as an annular combustor in the illustrated embodiment but may take on different forms in other embodiments, such as a canannular configuration to set forth just one non-limiting example. The combustor 254 mixes air with fuel delivered from a fuel control 255 and burns the mixture to produce heat needed for continued engine operation. The fuel control 255 determines the flow rate for fuel delivery based upon operating conditions, among other possible factors.

The heater 257 is powered by the generator 293 and positioned downstream of the compressor 264 and upstream of the combustor 254. When activated, the heater 257 is capable of heating combustion air prior to entry into the combustor 254. In other embodiments, the heater 257 could be positioned anywhere between the HP compressor 264 and the LP turbine 284. As used herein, the term "combustion air" means any gas whether or not the primary heat-producing process of the engine is combustion, and whether or not the gas can be considered air. As will be appreciated, use of the heaters within an engine associated with a military vehicle will not necessarily increase the infrared signature made by the vehicle, since the heat addition provided by the heater 257 may be offset by a reduction in fuel delivered to the combustor 254 and thus a reduction in heat produced by combustion. The heater 257 can be arranged as a single heater or an array of heaters, and furthermore may be a diffuse set of heating elements annularly distributed upstream of the combustor 254. The heater 257 includes any mechanism that allows electrical energy to be used to produce and transfer heat to the combustion air and includes such techniques as resistive heating, radiation heating, and the production of plasma.

The circuit 259 is capable of allocating power in selectable quantities between the Primary Load, depicted as the directed energy weapon 294, and the heater 257. The directed energy weapon 294 can take the form of the directed energy weapon embodiments described above. A rheostat 261 is used to select the desired power sharing arrangement in the illustrative embodiment. Though not depicted in FIG. 5, one or more switches and/or circuit breakers may be used to sever the power delivered to either the directed energy weapon 294 or the heater 257. Various other circuit arrangements are contemplated herein to share and/or distribute power. The circuit 259 may be operated manually or automatically, and may result in either step changes to the power sharing arrangement or any other variable changes that may not be readily predictable. The power may be dynamically allocated on the basis of current operational needs of the gas turbine engine 250, the tactical environment that the directed energy weapon 294 is operating within, or any other consideration. In some applications, excess power not needed by the directed energy weapon 294 may be diverted to the heater 257. For example, excess energy may be diverted whenever the directed energy weapon 294 is not engaged with a target, to set forth just one non-limiting example.

The directed energy weapon 294 receives electrical power provided from the generator 293 and converts it to radiant electromagnetic energy output. An antenna or other radiator may be included in the directed energy weapon 294 to provide for the radiant energy output. In one form, the directed energy weapon 294 is a form of a gyrotron that generates a directed, radiant electromagnetic output in the microwave range. In other forms the directed energy weapon 294 may be based on a form of laser, such as a free electron laser, that may extend from the microwave regime to the visible light spectrum. The directed energy weapon 294 may also be a combination of different radiant energy generators.

In one non-limiting form the operation of the gas turbine engine 250 can be described as follows. A two-spool gas turbine engine 250 is used to provide electrical power for a directed energy weapon 294 by driving an electrical generator 293 connected to its low-pressure (LP) spool. The directed energy weapon 294 can take the form of the directed energy weapon embodiments described above. A controller (not shown) for the generator 293 maintains an approximately constant mechanical rotation speed for the LP shaft 266. At idle power, no electrical power is produced by the generator 293, and the HP spool rotates at a relatively low speed compared to its design point. At least a few seconds before the directed energy weapon 294 is to be energized, the engine is placed in a standby mode. The generator 293 and the engine fuel flow are controlled to produce the full electrical power required by the directed energy weapon 294. All of this power, however, is directed to resistive heating elements between the HP compressor exit and the combustor inlet. These heat the air entering the combustor 254, reducing the amount of fuel that must be burned to produce the power being absorbed by the generator 293. In some forms of the present application the generator 293 may not produce all of the power required. The HP spool accelerates to the rotational speed required to sustain the new level of the LP shaft power. To energize the directed energy weapon 294, the electrical power is switched from the heating elements to the directed energy weapon. This provides nearly instantaneous power to the directed energy weapon, and requires no change in the rotational speed of the HP spool. The engine control increases the fuel flow to the combustor 254 as the heating elements cool to maintain a constant power delivery to the generator 293. To de-energize the directed energy weapon, the electrical energy is again switched to the heating elements. As long as the engine is to remain in standby mode, the engine control regulates the fuel flow to maintain constant power delivery to the generator 293. The return the engine to idle, the fuel flow is reduced causing a reduction in power delivered to the generator 293, a reduction in electrical power delivered to the heating elements, and less energy released by the heating elements to the engine cycle. In one form the engine and the generator 293 controls work together to maintain a constant LP rotational speed while the engine is returned to idle, at which condition no electrical power is delivered to the heating elements.

Figure 6:
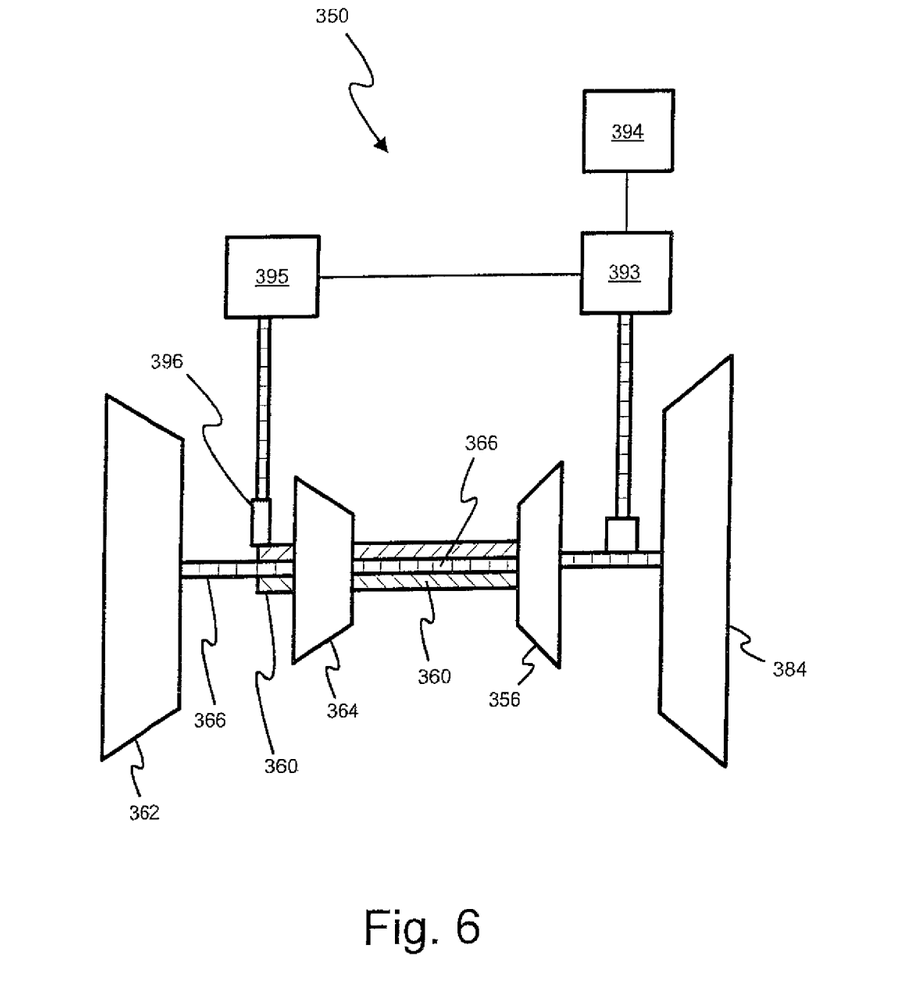
FIG. 6 depicts one embodiment of the present application.

Turning now to FIG. 6, the invention applies to a gas turbine engine 350 with more than one system of rotating shafts. Each system typically consists of a compressor 364 connected via a shaft 360 to a turbine 356. Each system is free to rotate at a speed different than that of the other systems, although devices, either mechanical, electrical, or otherwise, may transfer power from one shaft to another. The system involving the highest pressures at the compressor exit and the turbine inlet is referred to as the high-pressure, or HP, spool. Any number of rotating shaft systems may exist, and could be distinguished by terminology such as a high-pressure spool, an intermediate-pressure spool, a low-pressure spool, and so on. In one form the present application provides extracting power from a lower pressure system and applying it to one or more of the higher pressure spools. To set forth just a few non-limiting examples, the present application can provide extracting power from an LP spool and applying it to the HP spool, or extracting it from an intermediate pressure (IP) spool and applying it to the HP spool. If power is drawn from the lowest pressure system, or LP spool, it applies both to LP spools having a compressor 362 and a turbine 384 (an example being the LP spool of turbofan engines) and to LP spools having only a turbine 384 (an example being the LP spool of turboprop and turboshaft engines). The turbine component of this LP spool is herein referred to as the LP turbine 384 and the shaft as the LP shaft 366. The discussion below assumes that sustained high torque transfer from the LP turbine 384 to the LP shaft 366 requires higher rotational speeds of the other spools than is required for low torque transfer to the LP shaft 366. For example, high torque transfer from the LP turbine 384 to the LP shaft 366 can only be achieved at a high HP spool speed, whereas low torque transfer from the LP turbine 384 to the LP shaft 366 can be achieved at a low HP spool speed. This is true regardless of the speed of the LP spool under high or low torque transfer.

Consider operating condition "A" in which relatively little LP turbine torque, $T_A$, is transmitted to the LP shaft, and condition "B" in which more LP turbine torque, $T_B$, is transmitted to the LP shaft than in condition "A" ($T_B > T_A$). Suppose the engine is operating at condition "A", but a rapid transition to condition "B" is anticipated. Before the transition is actually required, the engine is controlled as necessary to cause more torque to be transmitted from the LP turbine to the LP shaft. Any excess power beyond that of condition "A", however, is transferred to one or more of the higher pressure spools. This power transfer can be accomplished by electrical, mechanical, or other means. The transfer of power causes the spool(s) to which it is transferred to accelerate. The end goal is to achieve a state in which the speed of the LP spool and the net torque transfer of the LP turbine to the LP shaft is about that of condition "A" but the speeds of the other spools are approximately those of condition "B". The engine can be considered to be in a standby mode for condition "B". The transfer from $T_B$ to $T_A$ can be accomplished rapidly because the high pressure spools are already rotating at or near their required speeds. The procedure can be reversed when a rapid decrease in power, as from $T_B$ to $T_A$, is required.

In one non-limiting example, a two-spool turboshaft gas turbine engine 350 is disclosed in FIG. 6 and is used to provide electrical power for an energy device 394, depicted in the illustrative embodiment as a directed energy weapon 394, by driving an electrical generator 393 connected to its low-pressure (LP) spool. In other applications the energy device 394 can take other forms. The directed energy weapon 394 can take the form of the directed energy weapon embodiments described above. A controller (not shown) for the generator 393 maintains an approximately constant mechanical rotation speed for the LP shaft 366. At idle power, no net electrical power is produced by the generator 393, and the HP spool rotates at a relatively low speed compared to its design point. An electric motor 395 is connected to the HP spool through a gearbox 396, but is supplying no power to the spool at the idle condition. At least a few seconds before the directed energy weapon 394 is to be energized, the gas turbine engine 350 is placed in a standby mode. The generator 393 and the engine fuel flow are controlled together to produce electrical power through the LP generator 393, but this power is directed to the HP motor 395 and used to accelerate the HP spool. Enough power is generated to achieve full design speed on the HP spool. In some forms, however, insufficient power may be generated. To energize the directed energy weapon 394, the electrical power directed to the HP motor 395 is instead directed to the directed energy weapon 394, and controlled engine parameters (such as fuel flow) are adjusted to supply the power required by the directed energy weapon 394. To de-energize the directed energy weapon 394, its electrical power is redirected to the HP motor 395, and engine control parameters adjusted to maintain constant HP spool speed. To return the engine to idle, the fuel flow is reduced so that power to the HP motor 395 also decreases until the normal idle configuration is achieved. A second example is like that described above, but with a continuous slipping clutch providing power transfer from the LP spool to the HP spool rather than an electric motor connected to the HP spool.

One aspect of the present application provides a gas turbine engine that includes a high pressure compressor having a plurality of rows of independently movable variable vanes. Each row of the plurality of rows of independently movable vanes can be set at a unique angle relative to an axis of rotation of the compressor. For example, a row of variable vanes in a first stage of the compressor may be set at an angle different from a row of variable vanes in a second stage of the compressor. In one mode of operation, the plurality of rows of vanes can be oriented to reduce the flow capacity of the compressor at a given speed. The fuel flow to the combustor is adjusted to maintain approximately the same supply of energy to components downstream of the turbine driving the compressor. This mode may be referred to as "standby" and is characterized by an increase in speed of the compressor. A compressor bleed or variable inlet guide vanes can also be used to supplement the vanes in achieving the desired effect. It will be appreciated that the engine may not be operating in an optimal setting in this configuration. If an increase in torque output is desired in a low pressure turbine of the gas turbine engine in a second mode of operation, then the vanes are repositioned to allow more flow through the compressor. The onset of the increased torque in this configuration may be better understood by contrast to a conventional gas turbine engine.

If a conventional gas turbine were operating in a normal mode of operation when an increase in torque output is desired and/or commanded, then the gas turbine would likely need to accelerate a high pressure compressor to a higher speed to achieve such an increase, which sometimes requires an undesirable "spool up" time that varies depending on the rotational inertia of the high pressure spool, among other things. In the instant application, however, the high pressure compressor need not be accelerated to a higher speed since it is already at the speed required for the high torque condition. Therefore, the torque output of the low pressure turbine is increased without an associated need to increase the speed of the high pressure compressor. In some embodiments, the increase in torque can occur rapidly.

A directed energy weapon can be coupled to the gas turbine engine and can be powered using the techniques described above. For example, the directed energy weapon could be placed in a standby mode and then rapidly powered by a change in configuration of the vanes.

Another aspect of the present application provides a gas turbine engine that includes a low pressure turbine having a plurality of rows of independently movable variable vanes. Each row of the plurality of rows of independently movable vanes can be set at a unique angle relative to an axis of rotation of the turbine. In one mode of operation, the plurality of rows of vanes can be positioned such that while the fuel flow to the combustor may be increased, the total low pressure turbine torque transmitted to a shaft remains approximately constant.

The increase in the fuel flow accelerates a high pressure compressor to a rotational speed at or near the speed required for sustained high torque output from the low pressure turbine. This mode of operation may sometimes be referred to as "standby." In this configuration, the engine may not be operating in an optimal setting. In a second mode of operation, if an increase in torque output is subsequently desired in the low pressure turbine then the vanes are repositioned to produce more torque. If the gas turbine were operating in a normal mode of operation when an increase in torque output is desired and/or commanded, then the gas turbine might need to accelerate the high pressure compressor to a higher speed. In the instant application, however, the compressor need not be accelerated to a higher speed since it is already at the speed required for the high torque condition. Therefore, the torque output of the low pressure turbine is increased without an associated need to increase the speed of the high pressure compressor. In some embodiments, the increase in torque can occur rapidly.

A further aspect of the present application provides a gas turbine engine having a generator connected to a low-pressure spool. At idle power, the generator produces no net electrical power and a high-pressure spool in the gas turbine engine rotates at a relatively low speed compared to its design point. An electric motor is connected to the high pressure spool through a gearbox but provides no power to the spool. The engine can be placed in a standby mode wherein the generator and the engine fuel flow are controlled to produce electrical power as the engine is accelerated. The electrical power is provided to the motor to assist in accelerating the high pressure spool to its full design speed faster than simply fueling alone. Once at the full design speed, the power output of the generator can be re-routed to provide power to a directed energy weapon, wherein controlled engine parameters such as the fuel flow may be further adjusted to account for the new configuration. Likewise, electrical power from the generator can be redirected to power the motor when the directed energy weapon is de-energized. The controlled engine parameters may again be adjusted to account for the change in configuration. To return the engine to idle, the fuel flow may be reduced which results in a corresponding reduction in power to the high pressure spool.

Yet another aspect of the present application provides a gas turbine engine having a turbine that provides power to a generator. The generator can be selectively configured to provide power to an external device, such as a directed energy weapon, or may provide power to heaters positioned downstream of a compressor and upstream of a combustor in the gas turbine engine. The heaters are configured to provide heat addition to the air stream entering the combustor. In this mode of operation, the turbine produces more power than is needed at the moment by the load connected to the generator. The direction of the excess energy to the heaters permits a reduction of fuel flow and establishes a standby mode for increased power demand from the generator. The engine is able to quickly respond to increased power demand from the generator by directing energy from the heaters to the load and increasing fuel flow as necessary.

One embodiment of the present application provides a system for providing rapid changes in output torque comprising a first operating mode which configures a gas turbine engine to operate at a first operating point having a first rotational speed of a compressor and a first torque output of a turbine, and a second operating mode which positions a plurality rows of independently movable variable vanes within the gas turbine engine, wherein a second speed of the compressor is substantially the same as the first speed and a second torque output of the turbine is higher than the first torque output.

One feature of the present application provides wherein the plurality of rows of independently movable variable vanes are in a high pressure compressor of the gas turbine engine.

Another feature of the present application provides wherein the second operating mode includes operating a bypass conduit to convey compressed air away from a core flow of the gas turbine engine.

Yet another feature of the present application provides wherein the second operating mode includes positioning a plurality of variable inlet guide vanes to the compressor.

Still another feature of the present application provides wherein the gas turbine engine is a multi-spool engine and the compressor is connected to a higher pressure spool than the turbine.

Yet a further feature of the present application provides wherein a controller is configured to provide the first operating mode and the second operating mode.

Still yet a further feature of the present application provides a directed energy weapon, wherein the directed energy weapon is energized after the gas turbine engine is commanded to the second operating mode.

Another embodiment of the present application provides a method comprising positioning a plurality of rows of variable vanes of a gas turbine engine, wherein at least two of the plurality of rows are independently movable, powering the gas turbine engine to rotate a compressor at a first speed and provide a torque output of a turbine, and providing an increase in torque output of the turbine while maintaining substantially the same rotational speed of the compressor by repositioning the plurality of rows of variable vanes.

One feature of the present application provides wherein the plurality of rows of variable vanes are in a high pressure compressor of the gas turbine engine.

Another feature of the present application provides venting airflow from the compressor.

Still another feature of the present application provides positioning a plurality of variable inlet guide vanes to the compressor.

Still a further feature of the present application provides powering the gas turbine engine includes controlling one or more of the plurality of rows of independently movable variable vanes, an engine fuel flow, and the venting airflow.

Yet still a further feature of the present application provides wherein the gas turbine engine includes a high pressure spool and a low pressure spool, and wherein the compressor is a high pressure compressor and the turbine is a low pressure turbine.

Still yet another feature of the present application provides driving an electrical generator from a shaft connected to the turbine.

Still another feature of the present application provides operating a directed energy weapon after the providing an increase in torque output of the turbine.

A further embodiment of the present application provides a system for providing rapid changes in output torque comprising a first operating mode which configures a gas turbine engine to operate at a first operating point having a first rotational speed of a compressor and a first torque output of a turbine, and a second operating mode which positions movable variable vanes within a turbine of the gas turbine engine, wherein a second speed of the compressor is substantially the same as the first speed and a second torque output of the turbine is higher than the first torque output.

A feature of the present application provides wherein the gas turbine engine includes a plurality of rows of movable variable vanes.

Another feature of the present application provides wherein movable variable vanes are in a low pressure turbine of the gas turbine engine.

Still another feature of the present application provides wherein the gas turbine engine is a multi-spool engine and the compressor is connected to a higher pressure spool than the turbine.

Still a further feature of the present application provides wherein a controller is configured to provide the first operating mode and the second operating mode.

Still yet another feature of the present application provides a directed energy weapon, wherein the directed energy weapon is energized after the gas turbine engine is commanded to the second operating mode.

Yet a further embodiment of the present application provides a method comprising positioning variable vanes within a turbine of a gas turbine engine, powering the gas turbine engine to rotate a compressor at a first speed and provide a torque output of the turbine, and providing an increase in torque output of the turbine while maintaining substantially the same rotational speed of the compressor by repositioning the variable vanes.

A feature of the present application provides wherein the turbine includes a plurality of rows of variable vanes.

Another feature of the present application provides wherein powering the gas turbine engine includes controlling one or more of the variable vanes and an engine fuel flow.

Still another feature of the present application provides wherein the gas turbine engine includes a high pressure spool and a low pressure spool, and wherein the compressor is a high pressure compressor and the turbine is a low pressure turbine.

Still yet another feature of the present application provides driving an electrical generator from a shaft connected to the turbine.

Still a further feature of the present application provides operating a directed energy weapon after the providing an increase in torque output of the turbine.

Yet another embodiment of the present application provides an apparatus comprising a gas turbine engine having a combustor and a turbine, and a heater positioned upstream of the combustor and configured to heat an incoming air flow into the combustor, wherein the turbine is used to provide power to the heater.

A feature of the present application provides wherein the turbine is a low pressure turbine.

Another feature of the present application provides a generator coupled with a shaft that rotates with the turbine, wherein the generator supplies power to the heater.

Yet another feature of the present application provides a directed energy weapon coupled with the generator, wherein power from the generator is selectively applied either to the directed energy weapon or the heater.

Still yet another feature of the present application provides a fuel control that offsets a fueling to the combustor when the incoming air to the combustor is heated by the heater.

Still a further feature of the present application provides wherein the heater includes electrical heating elements.

One form of the present application provides a method comprising operating a heater positioned upstream of a combustor of a gas turbine engine, wherein the heater selectively heats incoming air to the combustor and is powered by a turbine of the gas turbine engine.

A feature of the present application provides diverting power from the heater and supplying a diverted power to a directed energy weapon.

Another feature of the present application provides wherein an energy demand from the directed energy weapon is varying, and wherein the diverting power is varying.

Yet still another feature of the present application provides reducing a fuel delivery to the combustor when the heater is operating.

Still yet another feature of the present application provides wherein the turbine supplies mechanical power to a generator, and the generator supplies electrical power to the heater.

Another form of the present application provides a method comprising allocating power derived from a turbine to selectively heat an incoming airflow to a combustor or operate a directed energy weapon.

A feature of the present application provides wherein the allocating power is dynamic.

Another feature of the present application provides generating electricity from the power derived from the turbine, wherein the electricity is used to selectively heat the incoming airflow to a combustor or to operate the directed energy weapon.

A further form of the present application provides a method comprising positioning a heater within a gas turbine engine downstream from a compressor and upstream from a combustor, wherein the heater is powered by a turbine.

One feature of the present application provides wherein the allocating power is dynamic.

Another feature of the present application provides coupling a directed energy weapon to the gas turbine engine.

Yet another feature of the present application provides coupling a generator to the turbine, wherein the generator provides electricity to the heater and to the directed energy weapon.

Yet a further form of the present application provides an apparatus comprising a gas turbine engine having a compressor and a turbine, and a prime mover coupled to the compressor and capable of being powered by the turbine, wherein the compressor can be accelerated by the prime mover.

A feature of the present application provides wherein a spool that drives the compressor is higher pressure than a spool that is driven by the turbine.

Another feature of the present application provides a generator coupled to the turbine, wherein the generator provides power to the prime mover.

Still another feature of the present application provides a directed energy weapon capable of being powered by the gas turbine engine.

Yet still another feature of the present application provides wherein a generator coupled to the turbine is capable of providing power to the directed energy weapon.

Yet another form of the present application provides a method comprising coupling a prime mover to a compressor within a gas turbine engine wherein the power that energizes the prime mover originates from the turbine.

One feature of the present application provides coupling a generator to the turbine, wherein the generator provides electricity to energize the prime mover.

Another feature of the present application provides wherein the compressor is rotates with a higher pressure spool than the spool that rotates with the turbine.

One feature of the present application provides a method comprising operating a gas turbine engine at a first compressor speed, accelerating a spool of the gas turbine engine through the motive power of a prime mover, wherein the prime mover receives power from a turbine, and directing power from the prime mover to a directed energy weapon at a second compressor speed.

A feature of the present application provides coupling a generator to the turbine, wherein the generator provides electricity to energize the prime mover.

Another feature of the present application provides wherein no power is provided to the prime mover at the first compressor speed.

Yet another feature of the present application provides providing a fuel to a combustor to accelerate the spool of the gas turbine engine.

Still another feature of the present application provides wherein the prime mover is electrical or mechanical.

Another feature of the present application provides an apparatus comprising a gas turbine engine having at least two spools, the first spool having a low pressure compressor and a low pressure turbine and referred to as a LP spool, the second spool having a high pressure compressor and a high pressure turbine and referred to as a HP spool, and a prime mover coupled to the LP spool, the prime mover capable of generating work to selectively power the HP spool or a directed energy weapon.

A feature of the present application provides a gearbox coupled with an LP shaft of the LP spool and a shaft coupled between the gearbox and the prime mover.

Another feature of the present application provides a gearbox coupled with an HP shaft of the HP spool and a shaft coupled between the gearbox and a motor, the motor driven by the prime mover.

A further feature of the present application provides a method comprising coupling a prime mover to a lower pressure spool of a gas turbine engine, the prime mover operable to provide energy to power a higher pressure spool or an energy device.

A feature of the present application provides wherein the energy device is a directed energy weapon.

Another feature of the present application provides wherein the higher pressure spool is a high pressure spool.

Still another feature of the present application provides wherein the lower pressure spool is a low pressure spool.

Still yet another feature of the present application provides connecting a shaft and a gear box between the lower pressure spool and the prime mover.

Yet a further feature of the present application provides a method comprising operating a gas turbine engine, the gas turbine engine having a first pressure spool and a second pressure spool, wherein the first pressure spool operates at a lower pressure than the second pressure spool; and selectively providing power from a prime mover to either the second spool or a directed energy weapon.

A feature of the present application provides wherein the selectively providing power includes providing power to the second spool at a first speed, and providing power to the directed energy weapon at a second speed.

In one form a gas turbine engine is provided having variable vanes in a downstream location of an HP compressor. The vanes can be used to place the gas turbine engine in a standby mode by reducing the flow capacity of the compressor. Engine fueling can be controlled to maintain output torque of an LP system. When an increase in torque is required, the variable vanes can be repositioned to increase a flow through the compressor. In another form, a gas turbine engine is provided having variable vanes in an HP turbine. The vanes can be used to place the gas turbine engine in a standby mode with an associated change in engine fueling. When an increase in torque of the LP system is desired, the variable vanes can be repositioned. In yet another form, a gas turbine engine includes an LP shaft that can selectively drive a primary load and/or an electrical generator. Power from the generator can be used to power heating elements positioned in or upstream of the combustor. When power is not required to drive the primary load, the electrical generator can be used to power the heating elements to reduce fuel consumption in a standby mode. In still another form, a gas turbine engine includes an LP shaft that drives an electrical generator. The generator can power an electric motor which can selectively drive an HP spool. To enter a standby mode of operation, the electric motor can increase rotational speed of the HP spool.

Still yet another aspect of the present application includes an apparatus comprising a gas turbine engine having a shaft connecting turbomachinery components, a rotatable bladed component including rows of movable vanes, and an engine controller operable to provide for a plurality of engine operating conditions including: a first operating condition in which a plurality of the rows of movable vanes have a first position, the shaft operates at a first rotational speed, and the gas turbine engine provides a first torque output, a standby condition in preparation of transitioning from the first operating condition to a second operating condition in which the plurality of the rows of movable vanes have a standby position, the shaft operates at a standby rotational speed greater than the first rotational speed and the gas turbine engine provides a standby torque output, and wherein in the second operating condition the plurality of the rows of movable vanes have a second position, the shaft operates at a second rotational speed greater than the first rotational speed and the gas turbine engine provides a second torque output greater than the first torque output.

A still further aspect of the present application includes a method comprising transitioning from a low output controller configuration to a high output controller configuration by: positioning at least two rows of variable vanes of a gas turbine engine rotatable component to alter a flow capacity of the rotatable component relative to the low output controller configuration, in conjunction with the positioning, powering the gas turbine engine to rotate a shaft at a first speed and provide a torque output of a turbine, and generating an increase in torque output of the turbine while achieving substantially the same rotational speed of the shaft by repositioning the at least two rows of variable vanes.

Yet another aspect of the present application includes a method comprising operating a gas turbine engine including rotating a turbomachinery component at a first rotational speed, positioning variable vanes on opposite sides of rotating blades of the gas turbine engine to a changed airflow position relative to a position during the operating, associated with the positioning, delivering an energy to the gas turbine engine to provide for a second rotational speed of the turbomachinery component higher than the first rotational speed, re-positioning the variable vanes after the delivering, and increasing a torque output of the gas turbine engine.

Still yet a further aspect of the present application includes an apparatus comprising a gas turbine engine having a shaft associated with a relatively high pressure spool of a multi-spool engine, a turbine having variable vanes, and an engine controller operable to provide for a plurality of engine operating conditions including: a first operating condition in which the variable vanes have a first position, the shaft operates at a first rotational speed, and the gas turbine engine provides a first torque output, a standby condition in preparation of transitioning from the first operating condition to a second operating condition in which the variable vanes have a standby position, the shaft operates at a standby rotational speed greater than the first rotational speed and the gas turbine engine provides a standby torque output, and wherein in the second condition the variable vanes have a second position, the shaft operates at a second rotational speed greater than the first rotational speed and the gas turbine engine provides a second torque output greater than the first torque output.

A further aspect of the present application includes a method comprising transitioning from a low output controller configuration to a high output controller configuration by: positioning a plurality of variable vanes of a turbine within a gas turbine engine to a standby position with respect to a flow position associated with the low output controller configuration, in conjunction with the positioning, powering the gas turbine engine to change a flow rate through the turbine relative to the flow rate at the low output condition and provide a torque output of the turbine, and generating an increase in torque output of the turbine while achieving substantially the same rotational speed of the shaft by repositioning the plurality of variable vanes.

A still further aspect of the present application includes a method comprising operating a gas turbine engine including rotating a relatively high pressure turbine at a first rotational speed, positioning a plurality of variable vanes adjacent rotating blades of a relatively low pressure turbine of the gas turbine engine to an altered airflow position relative to a position during the operating, associated with the positioning, delivering an energy to the gas turbine engine to provide for a second rotational speed of the relatively high pressure turbine higher than the first rotational speed, re-positioning the variable vanes after the delivering, and increasing a torque output of the gas turbine engine.

Yet a still further aspect of the present application includes an apparatus comprising a gas turbine engine having a turbine operable to extract energy from a passing flow stream, and an energy transferring device coupled with the turbine and operable to receive the extracted energy, the energy transferring device operable to selectively return at least a portion of the extracted energy to a gas path component of the gas turbine engine or provide the extracted energy to an external energy system.

Another aspect of the present application includes a method comprising flowing a flow stream through a turbine of a multi-spool gas turbine engine to produce power from the rotation of the turbine, apportioning the power produced from the turbine among operating an external energy consuming system and operating a device within the gas turbine engine, and wherein the operating the device is one of assistingly rotating a spool shaft and heating a flow stream.

Still another aspect of the present application includes a method comprising generating power derived from a rotating turbine of a gas turbine engine, and allocating power derived from the turbine between an external primary load and an internal gas path component.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising: a gas turbine engine comprising a combustor, a high pressure spool and a low pressure spool, wherein the high pressure spool comprises a high pressure turbine, wherein the low pressure spool comprises a low pressure turbine, wherein the low pressure turbine is downstream of the high pressure turbine, and wherein the low pressure turbine is operable to convert energy from a working fluid of the gas turbine engine into a mechanical energy;

an electrical generator coupled to the low pressure turbine for converting the mechanical energy into an electrical energy; and an energy transferring device comprising an electrical heater and a power allocation circuit;

wherein the energy transferring device receives electrical energy from said generator, wherein the heater is in thermal communication with the working fluid, wherein the power allocation circuit is programmed to allocate the electrical energy in selectable ratios between the heater and an electrically powered system external to the gas turbine engine.

2. The apparatus of claim 1, wherein the heater delivers heat to the working fluid, and wherein the energy transferring device further includes a fuel control that offsets a fueling to the combustor when the working fluid is heated by the heater.

3. The apparatus of claim 1, wherein the heater delivers heat to the combustor.

4. The apparatus of claim 1, wherein the electrically powered system is a directed energy weapon.

5. The apparatus of claim 1, where the heater is positioned downstream of the combustor and upstream of the low pressure turbine.

6. The apparatus of claim 1, wherein the heater is positioned downstream of the combustor and upstream of the high pressure turbine.

7. The apparatus of claim 1, wherein the heater is positioned downstream of the high pressure turbine and upstream of the low pressure turbine.

* * * * *